United States Patent [19]

Coyle, Sr.

[11] Patent Number: 4,552,041

[45] Date of Patent: Nov. 12, 1985

[54] POWER TONGS CONTROL SYSTEM

[75] Inventor: William E. Coyle, Sr., Houma, La.

[73] Assignee: Bilco Tools, Inc., Houma, La.

[21] Appl. No.: 487,048

[22] Filed: Apr. 21, 1983

[51] Int. Cl.$^4$ ............................................. B25B 23/14
[52] U.S. Cl. ..................................................... 81/470
[58] Field of Search ...................... 81/467, 470; 173/12

[56] References Cited

U.S. PATENT DOCUMENTS

| | | |
|---|---|---|
| 3,693,727 | 9/1972 | Bell . |
| 3,719,237 | 3/1973 | Flick ..................................... 173/12 |
| 3,745,820 | 7/1973 | Weiner . |
| 3,768,573 | 10/1973 | Jennings . |
| 4,091,451 | 5/1978 | Weiner et al. . |
| 4,176,436 | 12/1979 | McCombs et al. . |
| 4,199,032 | 4/1980 | Weiner et al. ........................ 173/12 |
| 4,305,472 | 12/1981 | Brossette ............................... 173/12 |

Primary Examiner—James L. Jones, Jr.
Attorney, Agent, or Firm—Charles W. Fallow; Martin P. Hoffman; Mitchell B. Wasson

[57] ABSTRACT

The power tongs control system described herein includes a hydraulic load transducer in the tongs snub line, the transducer output controlling a shunt valve between the hydraulic lines leading to and from the tongs drive motor. At a predetermined threshold tongs torque, a switch is actuated by contact with a Bourdon tube connected to the transducer output closure of the switch causing the solenoid actuator to open the shunt valve and thereby halt operation of the tongs. A timer is provided to maintain the tongs in the disabled configuration for a period of time following initial cut off. Also disclosed is an adjustable choke valve in series with the shunt valve so that even following the opening of the shunt valve, substantial torque is maintained upon the pipe by the tongs.

12 Claims, 4 Drawing Figures

POWER TONGS CONTROL SYSTEM

BACKGROUND OF THE INVENTION

This invention relates to a system for automatically controlling power tongs to obtain a predetermined limited torque while making up drill pipe.

In making up a pipe string for an oil well, a series of sections or joints having threaded ends are assembled in series as the pipe progresses into the well. The threaded connections are made by rotating a pipe joint by means of power tongs while holding the next lower joint stationary. It is generally desirable and frequently required that some automatic means be provided to apply a predetermined torque to the joints since overtorquing can damage the threads particularly with some modern pipe materials chosen for characteristics other than strength. On the other hand, undertorquing can result in leakage or unintentional disassembly of the joints. In some makeup operations, it is required not only that makeup torque be closely monitored but also that a permanent record be made of the makeup torque at each threaded connection.

The prior art includes numerous hydraulic power tongs, many of which are in the public domain, of the type having a hydraulic motor connected via a gear train to a rotary member having jaws for gripping the pipe. There are various known ways of limiting power tongs torque. One approach is simply to limit the hydraulic pressure differential across the motor; knowing the pressure-torque relationship of the motor and the ratio of the gear train, a predetermined makeup torque can thus be achieved. This approach is illustrated in U.S. Pat. No. 3,719,237, for example. Another known approach, used in the present invention, is to physically connect a torque or load transducer to the tongs. U.S. Pat. Nos. 4,199,032; 4,305,472; 3,745,820 and 4,091,451 illustrate tongs that are restrained against rotation with the pipe joint by a so-called snub line in which a load cell is mounted. The output of the load cell may be hydraulic pressure, as in U.S. Pat. Nos. 4,199,032 and 4,305,472; or an electrical output may be produced, as in U.S. Pat. Nos. 3,745,820 and 4,091,451. To achieve tongs cut-off at a particular torque level, the transducer may be linked to hydraulic control means in the tongs' hydraulic drive circuit. U.S. Pat. No. 4,305,472 shows one approach employing a shunt valve which, when opened, allows fluid to bypass the tongs. This approach is taken in the present invention.

Some of the prior art systems are indeed quite sophisticated, in the sense of being complex; applicant has found, however, that such systems have drawbacks so serious as to render them undesirable to potential customers. Besides the obvious expense of complex systems, they tend to be fragile, incapable of repair in the field by people not specially trained for the purpose, and may result in unacceptable delays when they fail. Owing to their cost, it is not feasible to maintain a suitable number of spares on hand, and where the driller must maintain a permanent record of makeup torque at each joint, the entire drilling operation may be brought to a halt by failure of the torque controller.

It is therefore an object of the invention to provide the industry with a power tongs control unit capable of reliably limiting applied tongs torque at a predetermined level, maintaining the variations from the desired torque from joint to joint to a very small figure, and making a graphic permanent record of makeup torque while avoiding the disadvantages of the prior art. To these ends the applicant has set out to create a system avoiding the complexities of prior systems, particularly avoiding complex computers, electronic modules and the like while still achieving the primary goal of reliable, accurate torque control.

To summarize the invention, a conventional power tongs is controlled by a system including a hydraulic snub line load transducer, the output of which communicates with a Bourdon tube load indicator or recorder, a limit switch positioned adjacent the Bourdon tube so as to be closed when a certain pressure is reached within the tube, and a solenoid actuated dump valve positioned between hydraulic lines to the tongs' hydraulic motor, the solenoid being electrically connected to a battery via the limit switch so that when the switch is closed by the Bourdon tube, the solenoid valve is opened, disabling the tongs. The limit switch is adjustably mounted relative to the Bourdon tube so that the threshhold pressure, and by inference a corresponding tongs torque, can readily be adjusted.

Another aspect of the invention is the provision of hydraulic means for maintaining substantial torque on the pipe after tongs operation has been halted. Such means comprises an adjustable choke in series with the shunt valve, between the tongs motor's hydraulic lines, whereby a substantial pressure differential is maintained across the tongs motor even after the shunt valve opens.

As a further feature of the invention, there is provided an adjustable electronic timer which, once the solenoid valve has been opened by the closure of the limit switch, continues to energize the solenoid, thereby holding the valve open for a predetermined time period. This timer prevents dangerous reapplication of torque to the tongs immediately following the initial disabling of the tongs, yet automatically resets the shunt valve in its closed position after enough time has passed for the operator to disable the tongs manually.

The present invention achieves all the stated objectives above while providing advantages of simplicity, low cost, repairability and durability over known more complex devices. These and other advantages of the invention will be apparent from a reading of the following description.

DESCRIPTION OF A PRIOR ART DEVICE

Figure 1:
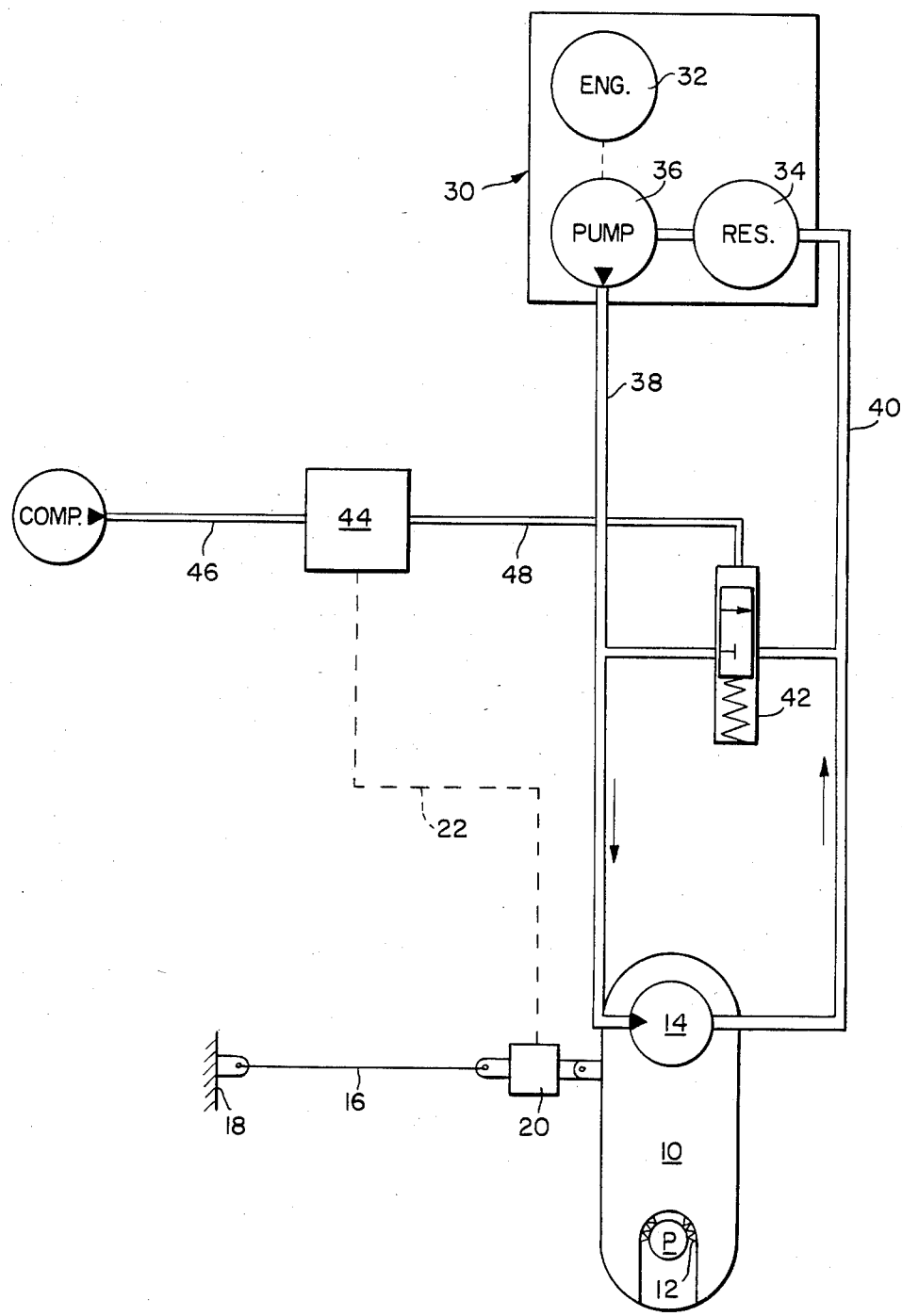
FIG. 1 illustrates a prior art torque limiting apparatus.

A known prior art tongs system is shown in FIG. 1 as including a power tongs 10 having jaws 12 for engaging a pipe P. The tongs have a hydraulic motor 14 which is mechnically connected to the jaws for rotating the same by a gear train (not shown). The tongs are capable of developing several thousand foot pounds of torque; they are therefore restrained from rotating about the pipe by a snub line 16, one end of which is secured to a stationary support 18 and the other end of which is secured to the tongs.

To determine the torque being applied to the pipe by the tongs at any moment, a hydraulic load transducer 20 is connected in the snub line 16. This transducer includes a piston or the like which generates a pressure in a transducer conduit 22 that is proportional to the load in the snub line. This pressure is used to control tongs operation as described hereafter.

The motor of the power tongs is driven by high pressure hydraulic fluid generated at the power unit designated generally as 30. This unit includes an internal combustion engine 32, a reservoir 34 and a hydraulic pump 36 driven by the engine. High pressure fluid passes from the pump 32 via a high pressure hose 38 to the inlet of the tongs motor 14. A return hose 40 is connected between the outlet of the tongs motor and the reservoir 30, and a pneumatically actuated dump valve 42 is connected between the inlet and outlet to the motor. This valve is normally closed, but when opened, allows fluid from the power unit to bypass the tongs motor thereby halting the tongs. The structure described to this point is found both in the present invention and in U.S. Pat. No. 4,305,472 (which uses different reference numerals). This prior art patent also shows a pneumatic controlling device 44 responsive to pressure in the transducer conduit 22 which automatically applies compressed air from source 46 to line 48 when a predetermined tongs torque is reached to open the pneumatically actuated shunt valve 42 and thereby halt the tongs operation.

DESCRIPTION OF A PREFERRED EMBODIMENT OF THE INVENTION

Figure 2:
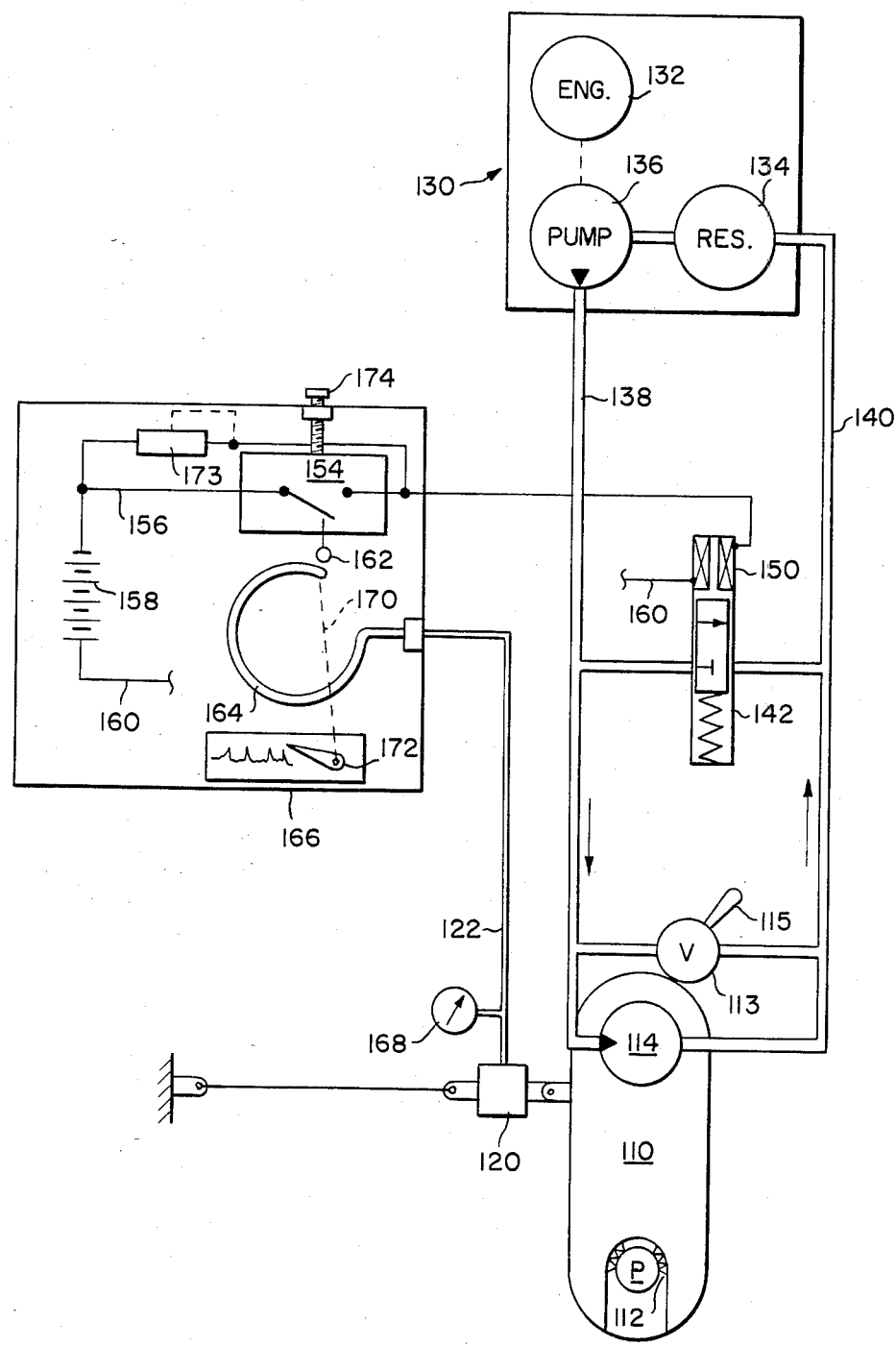
FIG. 2 depicts a preferred embodiment of the present invention.

FIG. 2 shows a preferred embodiment of the present invention and the similarities of the overall system to that shown in U.S. Pat. No. 4,305,472, will be apparent. FIG. 2 illustrates a tongs 110 having jaws 112 and a motor 114 that is hydraulically connected by lines 138 and 140 to a power unit 130 having an engine 132, a reservoir 134 and a pump 136. A bypass valve 113 is located on the tongs between the lines 138 and 140. This valve may be manually opened or closed by operating a lever 115 thereon.

The tongs are restrained from rotating around the pipe P by a snub line 116 connected to a stationary support 118 at one end and to a hydraulic transducer 120 at the other, which has an outlet conduit 122. Parallel to the bypass valve 113, a shunt valve 142 is connected between the inlet and outlet lines to the tongs motor 114. Here there is divergence from the prior art in that the dump valve has a solenoid actuator 150 connected by a conductor 152 to one terminal of a switch 154. The other terminal of the switch is connected by a conductor 156 to one terminal of a dry cell battery 158. A ground line 160 completes the circuit. The switch has a projecting actuating finger 162 which when depressed closes the switch, and the end of this finger is positioned in proximity to the free, closed end of a Bourdon tube 164. The other end of the Bourdon tube is firmly supported by an enclosure 166 and is in fluid communication with the transducer output conduit 122 previously referred to. A conventional pressure gage 168 is also connected to the transducer output. It is preferred that the face of the gage 168 be calibrated to indicate the torque being applied by the power tongs and this calibration would of course require consideration of the transducer load-to-pressure relationship as well as the radial distance from the pipe P to the snub line 116.

In the preferred system the free end of the Bourdon tube 164 is connected by appropriate mechnical linkage 170, indicated schematically by a broken line, to the arm of a stylus recorder 172. As mentioned above, it is frequently required to make a running record of torque supplied as the pipe is assembled and the recorder provides a permanent record.

Another important aspect of the invention is the provision of means for holding the shunt valve open for a period of time sufficient for the tongs operator to manually deactivate the tongs. It will be appreciated that without this feature, the instant the dump valve was activated, and the tongs torque thereby released, the transducer pressure would go to zero, the Bourdon tube would retract and the switch 154 would open, possibly causing rapid, dangerous reapplication of full tongs torque in a rapidly cyclic fashion.

To avoid this problem, a timer is provided in the electrical circuit which functions to maintain the application of electrical power to the solenoid dump valve for a predetermined time after it is actuated, regardless of whether the switch 154 is opened or closed. This timer is preferably adjustable so that the mandatory tongs-off interval can be adjusted from, say, two to four seconds. Such an interval gives the operator sufficient time to deactivate the tongs manually, without disabling the tongs so long as to slow the makeup operation.

In operation of the device, the power unit 130 continuously operates, producing high pressure fluid in the quantities required for the tongs. The tongs are placed around the pipe P and the operator manually throws the lever 115 thereby closing the bypass valve 113 and applying full pressure to the tongs, which cause the pipe joint to rotate as it is threaded into the next section below. When the threads are nearly completely engaged, the torque rises rapidly as does the snub line tension and therefore the pressure in conduit 122. The Bourdon tube correspondingly distends, engaging the switch actuator 162 and eventually closing the switch 154. At this point electrical power is applied to the solenoid 150 opening the shunt valve 142 and causing the tongs torque to drop to zero. Once the switch is closed, the timer maintains the circuit between the battery and the solenoid in a closed condition for a period of time and during this time the operator manually opens the valve 113. Thereafter, at the end of the interval for which the timer is set, the circuit is reopened, closing the shunt valve 142 so that the operator upon throwing the handle 115 can initiate another operating cycle.

An important feature of the invention is that not only can the timer mechanism be adjusted but so can the threshhold pressure at which the switch 158 becomes closed. This is accomplished by providing a simple threaded support 174 between the container 166 and the switch body whereby the distance between the actuator 162 and the free end of the Bourdon tube 164 can be varied.

It will be appreciated that either or both of these variables can be made fixed without departing from the invention in its broadest sense.

Figure 3:
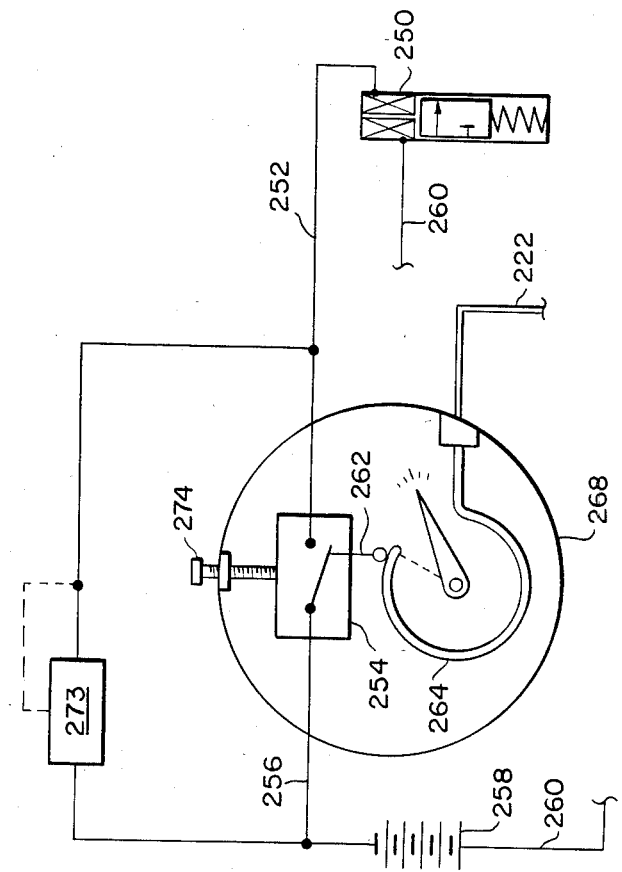
FIG. 3 shows an alternative embodiment of the invention.

FIG. 3 illustrates an alternative embodiment of the invention which is somewhat simpler yet retains the inventive aspects of the system shown in FIG. 2. In this embodiment the recorder has been dispensed with and replaced by a simple pressure gage 268, preferably calibrated to show tongs torque. The pressure gage 268 includes a Bourdon tube 264, the distendible end of which is connected by suitable linkage to the gage pointer. The gage contains electrical elements corresponding to the FIG. 2 embodiment, specifically a switch 254 having a protruding finger 262 engageable by the free end of the Bourdon tube, the switch preferably having an adjustable threaded mounting means 274 as shown. As in the previous embodiment, the switch is connected by conductors 252,256 and 260 between a battery 258 and the shunt valve solenoid actuator 250. The remainder of this system is structurally identical to that of FIG. 2 and its operation is also similar.

Figure 4:
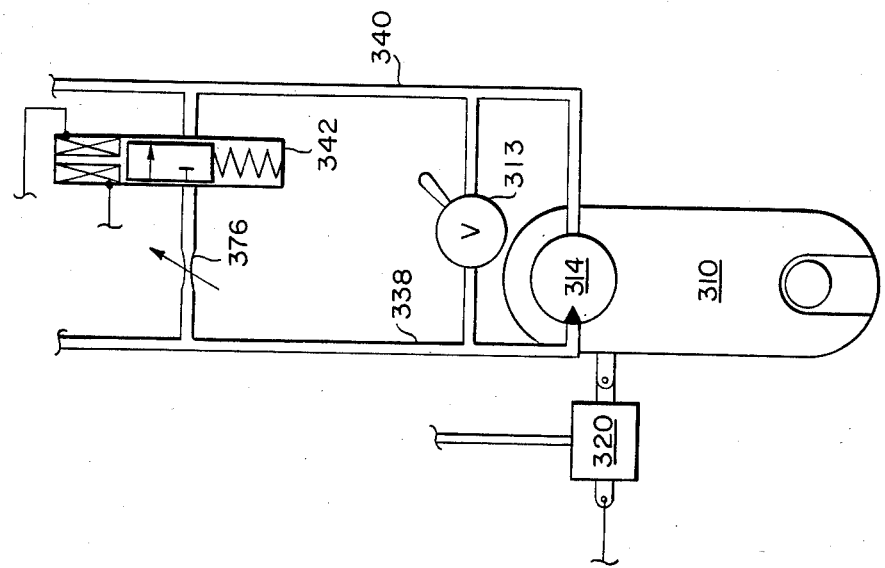
FIG. 4 shows a portion of a modified form of the invention.

FIG. 4 illustrates a modified form of the invention in which means are provided for maintaining substantial torque upon the pipe P even after the shunt valve 342 has been opened by the controller upon reaching the threshhold cutoff torque. The power unit is identical to that previously shown and the control mechanism may be as in either FIG. 2 or 3; therefore, only the portion of the system in the vicinity of the tongs is illustrated. As shown, the tongs 310 have a hydraulic motor 314 connected by hydraulic lines 338 and 340 to the power unit not shown. Between the lines 338 and 340, there is as before a manually operable bypass valve 313 and parallel to this valve also extending between the lines 338 and 340 is a shunt controlled by the shunt valve 342. What is different here is the addition of an adjustable choke 376 in the shunt in series with the valve 342. In operation the manually operable bypass valve 313 will have been closed by the operator to activate the tongs and the tongs will have rotated the pipe P into a fully madeup position. The pressure generated by the transducer 320 as this position was approached will have caused the controller (not shown) to activate the solenoid actuator 350 at the threshhold torque thereby opening the valve 342. At this point the manually operable bypass valve 313 is still closed so that fluid can avoid passing through the motor 314 only by passing through the shunt valve 342 and the choke 376. Without the choke, as previously mentioned, there would be substantially no resistance to fluid flow and the pressure differential across the motor 314 would be substantially zero. However with the choke 376 a substantial pressure differential can be maintained so that the tongs which have ceased rotation will still continue to apply torque to the threaded connections for a period of time. This feature desirably allows the threads to set and will provide increased uniformity in the effective madeup torque from joint to joint. The choke 376 is preferably adjustable whereby the torque level on the pipe following opening of the valve 342 can be adjusted as desired. This torque will of course be readable on the indicator used and will persist until the bypass valve 313 is manually opened by the operator. As in the other embodiments, the shunt valve 342 is held open by the timer sufficiently long to enable the operator to safely open the valve 313, whereafter the shunt valve 342 is automatically reset.

Inasmuch as various alterations, modifications and changes in detail may occur to one of skill in the art, it is intended that the embodiments described be taken as only illustrative of the invention whose full scope should be measured by the following claims.

I claim:

1. In a power tongs control system of the type including power tongs having a hydraulic motor thereon, and a power unit having a high pressure pump connected to the tongs motor by a pair of hydraulic lines, the system further including a snub line for restraining the tongs against rotation, and a hydraulic load transducer attached to the snub line so that the hydraulic transducer produces a pressure output—proportional to torque developed by the tongs—for selectively opening or closing a shunt valve connected between said hoses, the improvement comprising:

a solenoid actuator for the shunt valve, torque indicating means including a Bourdon tube supported at one end and connected to said transducer output, and a limit switch adjustably supported by said means adjacent the free end of the Bourdon tube so that said switch is closed by said tube when the pressure within the tube reaches a predetermined level, said switch, when closed establishing an electrical connection between a battery and the shunt valve solenoid whereby operation of the tongs is automatically halted when a predetermined torque corresponding to said predetermined pressure is reached.

2. The system recited in claim 1, further comprising means, including a timer, for holding said shunt valve open for a predetermined time period following the initial automatic opening of said valve whereby said tongs are positively prevented from operating during said time period.

3. The system recited in claim 2 wherein said means includes an adjustable timer so that said time period can be adjusted.

4. The system recited in claim 3 wherein said timer is adjustable between 2 and 4 seconds.

5. In a power tongs automatic control system of the type including power tongs having pipe engaging jaws driven by a hydraulic motor, and a power unit having a high pressure pump connected to the tongs motor by a pair of hydraulic lines, a shunt valve connected between the hydraulic lines and means for automatically opening said shunt valve when a predetermined threshhold torque is reached by said tongs, the improvement comprising:

a choke valve connected in series with said shunt valve between said hydraulic lines, said choke valve being adapted to resist the flow of fluid therethrough so that once said shunt valve opens, substantial pressure is maintained across said tongs hydraulic motor whereby torque is maintained upon a pipe joint engaged by said tongs jaws after operation of said tongs has been halted by the opening of said shunt valve.

6. The system recited in claim 5 further comprising means for maintaining said shunt valve in an open position for a predetermined period of time following the initial opening of said shunt valve regardless of the pressure differential existing across said tongs motor.

7. The system recited in claim 6 wherein said means for maintaining the shunt valve open comprises an adjustable timer so that said time period can be adjusted.

8. The system recited in claim 5 wherein said choke valve is adjustable so that the pressure maintained across said tongs hydraulic motor following the opening of said shunt valve can be regulated.

9. The system recited in claim 6 wherein said choke valve is adjustable so that the pressure maintained across said tongs hydraulic motor following the opening of said shunt valve can be regulated.

10. The invention as recited in claim 9 wherein said means for opening the shunt valve comprises
a snub line for restraining the tongs against rotation, a hydraulic load transducer attached to the snub line, so that the hydraulic transducer produces a pressure output proportional to torque developed by the tongs, torque indicating means including a Bourdon tube supported at one end and connected to said transducer output, and a limit switch adjustably supported by said torque indicating means adjacent the free end of said Bourdon tube so that said switch is closed by the tube when the pressure within the tube reaches a predetermined level, said switch when closed establishing an electrical connection between a battery and the shunt valve solenoid actuator whereby operation of the tongs is automatically halted when a predetermined torque corresponding to said predetermined pressure is reached.

11. The system recited in claim 9 wherein said means for maintaining said shunt valve open comprises an adjustable timer whereby said time period can be regulated.

12. The system recited in claim 10 wherein said means for maintaining said shunt valve open comprises an adjustable timer whereby said time period can be regulated.

* * * * *